United States Patent
Bostrom et al.

(10) Patent No.: US 7,269,415 B2
(45) Date of Patent: Sep. 11, 2007

(54) PLAYING ONE OR MORE VIDEOS AT ONE OR MORE MOBILE PHONES WHILE ONE OR MORE PHONE CALLS ASSOCIATED WITH THE ONE OR MORE MOBILE PHONES ARE ON HOLD

(75) Inventors: Kevin L. Bostrom, Naperville, IL (US); Gerald W. Pfleging, Batavia, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 677 days.

(21) Appl. No.: 10/731,239

(22) Filed: Dec. 9, 2003

(65) Prior Publication Data
US 2005/0124290 A1   Jun. 9, 2005

(51) Int. Cl.
*H04M 3/00* (2006.01)

(52) U.S. Cl. .............. 455/419; 455/566; 455/3.06; 455/414.1

(58) Field of Classification Search ............ 455/414.4, 455/414.1, 414.3, 415, 422.1, 446, 9, 517, 455/557, 3.01, 3.04, 3.06, 419, 420, 550.1, 455/432.3, 434, 452.1, 456.3, 515, 565, 566, 455/556.2; 379/215.01, 266.01, 265.02
See application file for complete search history.

(56) References Cited

U.S. PATENT DOCUMENTS

| | | | |
|---|---|---|---|
| 2002/0176559 A1* | 11/2002 | Adamek et al. | 379/215.01 |
| 2002/0191775 A1* | 12/2002 | Boies et al. | 379/266.01 |
| 2002/0194011 A1* | 12/2002 | Boies et al. | 705/1 |
| 2004/0266410 A1* | 12/2004 | Sand et al. | 455/414.4 |

FOREIGN PATENT DOCUMENTS

EP    1 244 282    9/2002

OTHER PUBLICATIONS

Handley, M. et al., "RFC 2543 SIP: Session Initiation Protocol", Network Working Group Request for Comments, Mar. 1999, p. 1-153, USA.

* cited by examiner

*Primary Examiner*—Edward F. Urban
*Assistant Examiner*—John J. Lee

(57) ABSTRACT

One or more video server components of an apparatus that play one or more videos at one or more mobile phones while one or more phone calls associated with the one or more mobile phones are on hold.

25 Claims, 2 Drawing Sheets

PLAYING ONE OR MORE VIDEOS AT ONE OR MORE MOBILE PHONES WHILE ONE OR MORE PHONE CALLS ASSOCIATED WITH THE ONE OR MORE MOBILE PHONES ARE ON HOLD

TECHNICAL HELD

The invention relates generally to mobile telecommunications and more particularly to playing videos at mobile phones.

BACKGROUND

Many businesses today employ one or more server components to answer incoming phone calls from calling phones. The server components in one example determine an intended recipient for the incoming phone calls and direct the phone calls to the intended recipient. For example, the server components attempt to connect the phone calls with employees of the business. When the employees are busy, the server components in one example place the phone calls on hold. In one example, while the phone calls are on hold, the server components play music at the calling phones for enjoyment by users of the calling phones. In another example, the businesses employ the server components to advertise products, services, and/or events to the users of the mobile phones.

Many mobile phones are able to display videos for users of the mobile phones. As one shortcoming, the server components do not play videos at the mobile phones while the phone calls associated with the mobile phones are on hold. As another shortcoming, the server components do not allow the users to choose the type of content that is played at the mobile phones while the phone calls associated with the mobile phones are on hold.

Thus, a need exists for a server component that plays videos at one or more mobile phones on hold. A further need exists to allow callers to choose the type of content that is played at the mobile phones while on hold.

SUMMARY

The invention in one implementation encompasses an apparatus. The apparatus comprises one or more video server components that play one or more videos at one or more mobile phones while one or more phone calls associated with the one or more mobile phones are on hold.

Another implementation of the invention encompasses a method. One or more video server components are instructed to play one or more videos at the one or more mobile phones while one or more phone calls associated with the one or more mobile phones are on hold.

A further implementation of the invention encompasses an article. The article comprises one or more computer-readable signal-bearing media. The article includes means in the one or more media for instructing one or more video server components to play one or more videos at the one or more mobile phones while one or more phone calls associated with the one or more mobile phones are on hold.

DESCRIPTION OF THE DRAWINGS

Features of exemplary implementations of the invention will become apparent from the description, the claims, and the accompanying drawings in which:

DETAILED DESCRIPTION

Figure 1:
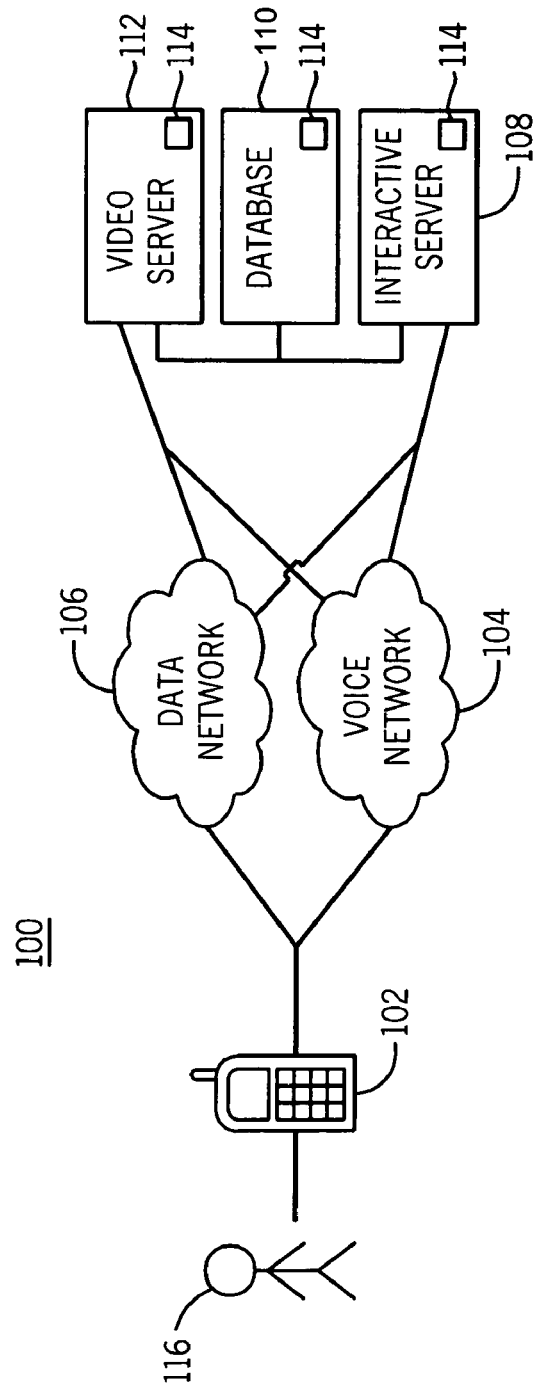
FIG. 1 is a representation of an exemplary implementation of an apparatus that comprises one or more mobile phones, one or more network components, one or more interactive server components, one or more databases, and one or more video server components.

Turning to FIG. 1, the apparatus 100 in one example comprises one or more mobile phones 102, one or more network components 104 and 106, one or more interactive server components 108, one or more databases 110, and one or more video server components 112. A home or business in one example employs the interactive server component 108 to handle one or more phone calls. For example, a user 116 of the mobile phone 102 may place a phone call to the home or business. The interactive server component 108 in one example places the phone call from the mobile phone 102 on hold. While the phone call from the mobile phone 102 is on hold, the video server component 112 plays one or more videos at the mobile phone 102.

The user 116 of the mobile phone 102 in one example is a customer of the business. For example, the user 116 buys products and/or services from the business. The mobile phone 102 comprises a screen to display videos to users of the mobile phone 102. The mobile phone 102 communicates over the network components 104 and 106. For example, the mobile phone 102 can contemporaneously communicate over both the network components 104 and 106.

In one example, the user 116 employs the mobile phone 102 to place the phone call to the interactive server component 108 through the network component 104. The network component 104 in one example comprises a voice network. For example, the network component 104 comprises a public land mobile network ("PLMN").

In another example, the user 116 employs the mobile phone 102 to place the phone call to the interactive server component 108 through a voice over internet protocol ("VoIP") network. For example, the voice over internet protocol network employs the network components 104 and 106. For example, the voice over internet protocol network communicates data and/or voice communications between one or more of the mobile phone 102, the interactive server component 108, and the video server component 112. The network component 106 in one example comprises a data network.

One or more of the network components 104 and 106 pass the phone call from the mobile phone 102 to the interactive server component 108. The interactive server component 108 attempts to connect the phone call with an intended recipient. If the intended recipient is unavailable, the interactive server component 108 handles the phone call. For example, the intended recipient may comprise an employee of the business associated with the interactive server component 108 and the employee may be busy. Thus, the interactive server component 108 places the phone call on hold when the employee is busy. The interactive server component 108 in one example comprises an interactive voice response ("IVR") server component. The interactive server component 108 in one example comprises an instance of the recordable data storage medium 114.

In one example, the phone call from the mobile phone 102 comprises user information. The user information in one example comprises a caller identification of the user 116 of the mobile phone 102. In another example, the user 116 is a new customer of the business and the phone call does not contain user information. If the phone call does not comprise user information, the interactive server component 108 requests the user information from the user 116. The user information in one example comprises one or more of a name, an address, a phone number, and other customer identifying information of the user 116. If the user 116 is a new customer, the interactive server component 108 in one example enters the user information into the database 110. If the user 116 is a returning customer of the business, the interactive server 108 in one example searches the database 110 with the user information to make a determination of one or more user preferences of the user 116 of the mobile phone 102.

The database 110 returns the user preferences to one or more of the interactive server component 108 and the video server component 112. The database 110 in one example comprises a customer relationship management ("CRM") server component. For example, the one or more of the interactive server component 108 and the video server component 112 can search the database 110 with the call information and the user information for the user preferences of customers stored in the database 110. The database 110 in one example comprises an instance of the recordable data storage medium 114.

The video server component 112 plays the video at the mobile phone 102 for the user 116. For example, if the user 116 is a returning customer of the business, the video server component 112 plays the video at the mobile phone 102 based on the user preferences stored in the database 110. If the user 116 is a new customer of the business, the video server component 112 plays any video at the mobile phone 102. For example, the video server component 112 may play an advertisement of the business at the mobile phone 102 for the user 116. The video server component 112 comprises an instance of the recordable data storage medium 114. In one example, the video server component 112 streams the video to the mobile phone 102 through the network component 106. In another example, the video server component 112 streams the video to the mobile phone 102 through the voice over internet protocol network.

The interactive server component 108 or the video server component 112 in one example sends one or more messages to the mobile phone 102. The messages in one example comprise one or more short message service messages ("SMS"). The interactive server component 108 or the video server component 112 sends the message to the mobile phone 102 to ask for permission from the user 116 to play the video at the mobile phone 102. The message in one example provides a choice between a plurality of videos, such as, a first video and a second video. For example, the first video is stored at a first internet protocol address and the second video is stored at a second internet protocol address. The user 116 employs the mobile phone 102 to reply to the choice presented in the message with a selection to play either the first video or the second video. For example, the user 116 presses a button or uses a voice command with the mobile phone 102 to make the choice of the first video or the second video.

In one example, one or more of the interactive server component 108 and the video server component 112 obtain the selection from the mobile phone 102 of the first video or the second video. Upon receipt of the selection, the video server component 112 plays the first video or the second video through the network component 106 or the voice over internet protocol network to the mobile phone 102. For example, the video server component 112 connects the mobile phone 102 to the first internet protocol address of the first video or the second internet protocol address of the second video. In another example, the interactive server component 108 or the video server component 112 does not provide the mobile phone 102 with a choice of videos. For example, the video server component 112 may play the video at the mobile phone 102 while the mobile phone 102 is on hold without permission from the user 116 of the mobile phone 102.

The user 116 employs the mobile phone 102 to watch the video. Upon an intended recipient of the phone call becoming available, the interactive server component 108 in one example sends a message to the video server component 112 to stop playing the video at the mobile phone 102. Then, the interactive server component 108 takes the phone call off hold and attempts to connect the phone call with the intended recipient.

Figure 2:
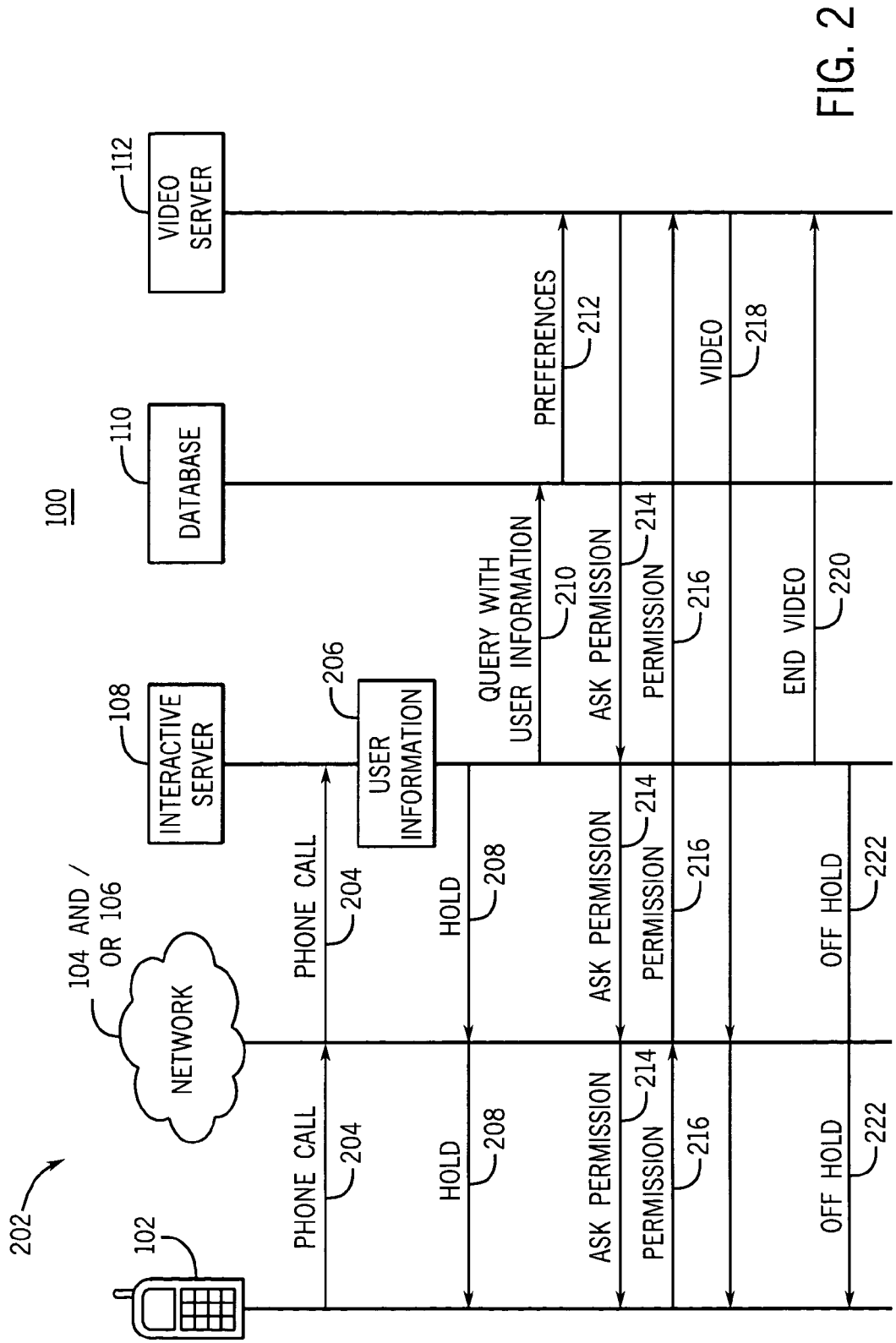
FIG. 2 is a representation of an exemplary implementation of a message flow that illustrates playing one or more videos at the mobile phones by the video server component of FIG. 1.

Referring to FIGS. 1 and 2, an illustrative description of exemplary operation of the apparatus 100 is now presented, for explanatory purposes. Message flow 202 illustrates the video server component 112 playing one or more videos to the mobile phone 102. For example, the video server component 112 plays the videos at the mobile phone 102 while a phone call associated with the mobile phone is on hold.

The user 116 in one example employs the mobile phone 102 to place a phone call 204 to a home or business. For example, the network component 104 or the voice over internet protocol network passes the phone call 204 from the mobile phone 102 to the interactive server component 108 associated with the home or business. Upon receipt of the phone call 204, the interactive server component 108 obtains user information 206 associated with the user 116 of the mobile phone 102. In one example, the interactive server component 108 asks the user 116 of the mobile phone 102 for the user information 206. In another example, the interactive server component 108 extracts the user information 206 from the phone call 204. Upon receipt of the user information 206, the interactive server component 108 may place the phone call on hold 208.

Also upon the receipt of the user information 206, the interactive server component 108 performs a query 210 of the database 110 with the user information 206 to make a determination of one or more user preferences 212. "QUERY WITH USER INFORMATION" in one example serves to represent the query 210 of the database 110. The database 110 passes the user preferences 212 to the interactive server component 108 or the video server component 112.

Upon receipt of the user preferences 212, the interactive server component 108 or the video server component 112 in one example sends a query message 214 through the network component 106 or the voice over internet protocol network to the user 116 of the mobile phone 102. For example, the interactive server component 108 or the video server component 112 sends the query message 214 to ask for permission from the user 116 of the mobile phone 102 to play a video 218 at the mobile phone 102. "ASK PERMISSION" in one example serves to represent the query message 214. Upon receipt of the query message 214, the user 116 in one example employs the mobile phone 102 to send a reply message 216 with the permission to play the video 218 at the mobile phone 102 through the network component 106 or the voice over internet protocol network to the interactive server component 108 or the video server component 112. "PERMISSION" in one example serves to represent the reply message 216.

Upon receipt of the reply message 216 from the mobile phone 102, the video server component 112 plays the video 218 at the mobile phone 102 through the network component 106 or the voice over internet protocol network. For example, the video server component 112 connects the mobile phone 102 to an internet protocol address of the video 218. The user 116 in one example employs the mobile phone 102 to view the video 218.

When an intended recipient at the location of the interactive server component 108 becomes available, the interactive server component 108 in one example sends a notification 220 to the video server component 112 to end the video 218. "END VIDEO" in one example serves to represent the notification 220 to end the video 218. The interactive server component 108 in one example takes the phone call associated with the mobile phone 102 off hold 222. "OFF HOLD" in one example serves to represent the phone call off hold 222. Then, the interactive server component 108 in one example connects the phone call from the mobile phone 102 with the intended recipient.

The apparatus 100 in one example comprises a plurality of components such as one or more hardware components and one or more computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 114 of the interactive server component 108, the database 110, and the video server component 112. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    one or more video server components that play one or more videos at one or more mobile phones while one or more phone calls associated with the one or more mobile phones are on hold;
    wherein the one or more video server components that play the one or more videos at the one or more mobile phones comprise a video server component that plays a video for a mobile phone; and
    wherein the video server component sends a query message to the mobile phone for permission to send the video to the mobile phone; and
    wherein the video comprises a first video and wherein the internet protocol address comprises a first internet protocol address; and
    wherein the query message comprises a choice between the first video and a second video, and wherein the first video is stored at the first internet protocol address and the second video is stored at a second internet protocol address; and
    wherein a user of the mobile phone employs the mobile phone to reply to the choice with a selection of the first video or the second video, and wherein the mobile phone sends the selection to the video server component; and
    wherein the video server component employs the selection to connect the mobile phone to the first internet protocol address for the first video or the second internet protocol address for the second video.

2. The apparatus of claim 1, further comprising an interactive server component;
    wherein the one or more video server components that play the one or more videos at the one or more mobile phones while the one or more phone calls associated with the one or more mobile phones are on hold comprise a video server component that plays a video for a mobile phone while a phone call associated with the mobile phone is on hold; and
    wherein the interactive server component connects with the phone call associated with the mobile phone through a voice network component; and
    wherein the interactive server component places the phone call associated with the mobile phone on hold.

3. The apparatus of claim 2, wherein the phone call associated with the mobile phone comprises user information, and wherein the interactive server component searches a database with the user information to make a determination of one or more user preferences of a user of the mobile phone; and
    wherein the interactive server component passes the one or more user preferences to the video server component.

4. The apparatus of claim 3, wherein the video server component employs one or more of the one or more user preferences to determine which video of a plurality of videos to play at the mobile phone.

5. The apparatus of claim 2, wherein the video server component or the interactive server component sends a query message to the mobile phone for permission to play the video at the mobile phone.

6. The apparatus of claim 5, wherein the query message comprises an internet protocol address for connection to the video; and
    wherein the mobile phone replies to the video, server component or the interactive server component with permission to play the video, wherein the video server component connects the mobile phone to the video at the internet protocol address through a data network.

7. The apparatus of claim 5, wherein a voice over internet protocol network comprises the voice network component and a data network, and wherein the query message comprises an internet protocol address for connection to the video; and
    wherein the mobile phone replies to the video server component or the interactive server component with permission to play the video, and wherein the video server component connects the mobile phone to the video at the internet protocol address through the voice over internet protocol network.

8. The apparatus of claim 2, wherein the interactive server component notifies the video server component to stop playing the video at the mobile phone, and wherein the interactive voice server component takes the phone call associated with the mobile phone off hold.

9. The apparatus of claim 1, wherein the query message comprises an internet protocol address for connection to the video, and wherein the mobile phone replies to the video server component with permission to play the video, and wherein the video server component connects the mobile phone with the internet protocol address to play the video at the mobile phone.

10. An apparatus, comprising:
one or more video server components that play one or more videos at one or more mobile phones while one or more phone calls associated with the one or more mobile phones are on hold;
the apparatus further comprising an interactive server component;
wherein the one or more video server components that play the one or more videos at the one or more mobile phones while the one or more phone calls associated with the one or more mobile phones are on hold comprise a video server component that plays a video for a mobile phone while a phone call associated with the mobile phone is on hold; and
wherein the interactive server component connects with the phone call associated with the mobile phone through a voice network component; and
wherein the interactive server component places the phone call associated with the mobile phone on hold; and
wherein the interactive server component requests user information from a user of the mobile phone; and
wherein upon a receipt of the user information from the mobile phone, the interactive server component searches a database with the user information to make a determination of one or more user preferences of the user of the mobile phone; and
wherein the interactive server component passes the one or more user preferences to the video server component.

11. The apparatus of claim 10, wherein the video server component employs one or more of the one or more user preferences to determine which video of a plurality of videos to play at the mobile phone.

12. A method, comprising the step of:
instructing one or more video server components to play one or more videos at the one or more mobile phones while one or more phone calls associated with the one or more mobile phones are on hold;
wherein the one or more video server components that play the one or more videos at the one or more mobile phones comprise server component that plays a video at a mobile phone while a phone call associated with the mobile phone is on hold; and
wherein the step of instructing the one or more video server components to play the one or more videos at the one or more mobile phones while the one or more phone calls associated with the one or more mobile phones are on hold comprises the step of:
sending a query message to the mobile phone for permission to play the video at the mobile phone;

wherein the one or more videos comprise a first video and a second video, and wherein the query message comprises a choice between the first video and the second video, and wherein the first video is stored at a first internet protocol address and the second video is stored at a second internet protocol address, and
wherein the step of sending the query message to the mobile phone for permission to play the video at the mobile phone comprises the steps of:
receiving a reply from a user of the mobile phone with a selection of the first video or the second video; and
employing the selection of the first video or the second video to connect the mobile phone to the first internet protocol address for the first video or the second internet protocol address for the for the second video.

13. A method, comprising the step of:
instructing one or more video server components to play one or more videos at the one or more mobile phones while one or more phone cells associated with the one or more mobile phones are on hold;
wherein the one or more video server components that play the one or more videos at the one or more mobile phones comprise a video server component that plays a video at a mobile phone while a phone call associated with the mobile phone is on hold; and
wherein the step of instructing the one or more video server components to play the one or more videos at the one or more mobile phones while the one or more phone calls associated with the one or more mobile phones are on hold comprises the steps of:
obtaining user information of a user of the mobile phone from the phone call associated with the mobile phone; and
searching a database with the user information of the user of the mobile phone to determine one or more user preferences of the user of the mobile phone.

14. The method of claim 13, wherein the step of searching the database with the user information of the user of the mobile phone to determine the one or more user preferences of the user of the mobile phone comprises the step of:
employing one or more of the one or more user preferences to determine which video of a plurality of videos to play at the mobile phone.

15. The method of claim 13, further comprising the steps of:
ending a transmission of one or more of the one or more videos at one or more of the one or more mobile phones; and
taking one or more of the one or more phone calls associated with the one or more of the one or more mobile phones off hold.

16. A computer-readable medium having computer executable instructions for performing steps, comprising:
means in the computer-readable medium for instructing one or more video server components to play one or more videos at the one or more mobile phones while one or more phone calls associated with the one or more mobile phones are an hold;
wherein the one or more video server components that play the one or more videos at the one or more mobile phones comprise a video server component that plays a video at a mobile phone while a phone call associated with the mobile phone is on hold; and
wherein the step of instructing the one or more video server components to play the one or more videos at the one or more mobile phones while the one or more phone calls associated with the one or more mobile phones are on hold comprises the steps of:

obtaining user information of a user of the mobile phone from the phone call associated with the mobile phone; and searching a database with the user information of the user of the mobile phone to determine one or more user preferences of the user of the mobile phone.

17. A system comprising:

an interactive server component that comprises means to employ user information associated with a mobile phone to search a database to determine one or more video preferences of a user of the mobile phone, wherein the interactive server component comprises means to receive a phone call associated with the mobile phone from one or more network components and means to place the phone call on hold when an intended recipient is busy; and a video server component that comprises means to employ at least one of the one or more video preferences and means to play a video from a plurality of videos at the mobile phone based on the one or more video preferences, wherein the user selects the video via the mobile phone, and wherein the video server component employs the means to play the video at the mobile phone while the phone call associated with the mobile phone is on hold.

18. The system of claim 17, wherein the video server component comprises means to send a query message to the mobile phone for permission to send the video to the mobile phone, and wherein the query message comprises an internet protocol address for connection to the video; and wherein the mobile phone comprises means enabling the user to reply to the video server component with permission to play the video, and wherein the video server component comprises means to connect the mobile phone with the internet protocol address to play the video at the mobile phone.

19. The system of claim 17, wherein the video comprises a first video stored at a first internet protocol address; and wherein the video server component comprises means to send a query message to the mobile phone for permission to send the first video or a second video to the mobile phone, and wherein the query message comprises a choice between the first video stored at the first internet protocol address and the second video stored at a second internet protocol address; and wherein the mobile phone employs means enabling the user to reply to the choice with a selection of the first video or the second video and to send the selection to the video server component; and wherein the video server component comprises means to employ the selection to connect the mobile phone) to the first internet protocol address for the first video or the second internet protocol address for the second video.

20. The system of claim 17, wherein the interactive server component comprises means to connect with the phone call associated with the mobile phone through a voice network component; and wherein the interactive server component comprises means to request user information from a user of the mobile phone; and wherein the interactive server component comprises means to place the phone call associated with the mobile phone on hold; and wherein upon a receipt of the user information from the mobile phone, the interactive server component comprises means to search the database with the user information to determine the one or more video preferences of the user of the mobile phone; and wherein the interactive server component comprises means to pass the one or more video preferences to the video server component.

21. The system of claim 17, wherein the interactive server component comprises means to connect with the phone call associated with the mobile phone through a voice network component; and wherein the interactive server component comprises means to place the phone call associated with the mobile phone on hold; and wherein the phone call associated with the mobile phone comprises user information, and wherein the interactive server component comprises means to search the database with the user information to determine the one or more video preferences of the user of the mobile phone; and wherein the interactive server component comprises means to pass the one or more video preferences to the video server component.

22. The system of claim 17, wherein the interactive server component comprises means to connect with the phone call associated with the mobile phone though a voice network component; and wherein the interactive server component comprises means to place the phone call associated with the mobile phone on hold;

wherein the video server component comprises means to send a query message to the mobile phone for permission to play the video at the mobile phone, and wherein the query message comprises an internet protocol address for connection to the video and wherein the mobile phone comprises means enabling the user to reply to the video server component with permission to play the video, and wherein the video server component comprises means to connect the mobile phone to the video at the internet protocol address through a data network.

23. The system of claim 17, wherein the interactive server component comprises means to connect with the phone call associated with the mobile phone through a voice network component;

wherein the interactive server component comprises means to place the phone call associated with the mobile phone on hold; and wherein the video server component comprises means to send a query message to the mobile phone for permission to play the video at the mobile phone, and wherein the query message comprises an internet protocol address for connection to the video; and wherein a voice over internet protocol network comprises the voice network component and a data network, and wherein the mobile phone comprises means enabling the user to reply to the video server component with permission to play the video, and wherein the video server component comprises means to connect the mobile phone to the video at the internet protocol address through the voice over internet protocol network.

24. A method of placing on hold a phone call associated with a mobile phone, comprising the steps of:
- searching, via an interactive server component, a database to determine one or more video preferences of a user of the mobile phone;
- employing at least one of the one or more video preferences, via a video server component, to play a video from a plurality of videos selected by the user via the mobile phone to play at the mobile phone while the phone call associated with the mobile phone is on hold;
- sending a query message to the mobile phone for permission to play the video at the mobile phone, wherein the query message comprises a choice between the first video and a second video, and wherein the first video is stored at a first internet protocol address and the second video is stored at a second internet protocol address;
- receiving a reply from a user of the mobile phone with a selection of the first video or the second video;
- employing the selection of the first video or the second video to connect the mobile phone to the first internet protocol address for the first video or the second internet protocol address for the second video;
- ending a transmission of the first video or the second video at the mobile phone; and
- taking the phone call associated with the mobile phone off hold when an intended recipient becomes available.

25. A method of placing on hold a phone call associated with a mobile phone, comprising the steps of:
- searching, via an interactive server component a database to determine one or more video preferences of a user of the mobile phone;
- employing at least one of the one or more video preferences, via a video server component, to play a video from a plurality of videos selected by the user via the mobile phone to play at the mobile phone while the phone call associated with the mobile phone is on hold;
- obtaining user information of the user of the mobile phone from the phone call associated with the mobile phone;
- searching a database with the user information of the user of the mobile phone to determine the one or more video preferences of the user of the mobile phone;
- playing the video at the mobile phone;
- ending a transmission of the video at the mobile phone; and
- taking the phone call associated with the mobile phone off hold when the intended recipient becomes available.

* * * * *